United States Patent
Beckmann et al.

(10) Patent No.: US 8,305,902 B2
(45) Date of Patent: Nov. 6, 2012

(54) METHOD FOR MONITORING MESSAGE TRAFFIC, AND A FIRST AND SECOND NETWORK UNIT FOR THE EXECUTION THEREOF

(75) Inventors: Mark Beckmann, Braunschweig (DE); Holger Schmidt, Braunschweig (DE)

(73) Assignee: Siemens Aktiengesellschaft, Munich (DE)

( * ) Notice: Subject to any disclaimer, the term of this patent is extended or adjusted under 35 U.S.C. 154(b) by 38 days.

(21) Appl. No.: 11/658,839

(22) PCT Filed: Jun. 22, 2005

(86) PCT No.: PCT/EP2005/052914
§ 371 (c)(1),
(2), (4) Date: Oct. 1, 2008

(87) PCT Pub. No.: WO2006/013133
PCT Pub. Date: Feb. 9, 2006

(65) Prior Publication Data
US 2009/0028060 A1 Jan. 29, 2009

(30) Foreign Application Priority Data
Jul. 29, 2004 (DE) .......................... 10 2004 036 732

(51) Int. Cl.
*H04J 3/14* (2006.01)
(52) U.S. Cl. ...................................................... 370/241
(58) Field of Classification Search ........................ None
See application file for complete search history.

(56) References Cited

U.S. PATENT DOCUMENTS

| 7,046,680 | B1* | 5/2006 | McDysan et al. ............. 370/396 |
| 2002/0036983 | A1* | 3/2002 | Widegren et al. .......... 370/230.1 |
| 2004/0059913 | A1 | 3/2004 | De Jong |
| 2004/0109459 | A1* | 6/2004 | Madour et al. ................ 370/401 |
| 2004/0131042 | A1* | 7/2004 | Lillie et al. ..................... 370/351 |
| 2005/0058068 | A1* | 3/2005 | Ben Ali et al. ................ 370/230 |
| 2005/0094621 | A1* | 5/2005 | Acharya et al. ............... 370/352 |
| 2005/0243870 | A1* | 11/2005 | Balogh et al. ................. 370/522 |
| 2006/0052087 | A1* | 3/2006 | Tuunanen et al. ......... 455/414.1 |

FOREIGN PATENT DOCUMENTS
EP 1 317 108 A1 6/2003
WO 02/37870 A2 5/2002

OTHER PUBLICATIONS

"End-to-end Quality of Service (QoS) concept and architecture;" 3GPP TS 23.207; V6.3.0; Jun. 2004; pp. 1-53.
W. Marshall; "Private Session Initiation Protocol (SIP) Extensions for Media Authorization;" IETF RFC 3313; Jan. 2003; 14 pp.
J. Reynolds, et. al.; "Assigned Numbers;" Network Working Group RFC 1700; Oct. 1994; 190 pp.

(Continued)

*Primary Examiner* — Kevin C Harper
(74) *Attorney, Agent, or Firm* — Staas & Halsey LLP

(57) ABSTRACT

Message traffic between a communications unit and a first network unit of a mobile radio system, initiated by an SIP control message, is monitored. The SIP control message is evaluated by a second network unit by using at least one analysis parameter and an analysis result is generated therefrom. The analysis result is used for generating at least one item for utilization information of the first network unit that monitors the message traffic between the communications unit and the first network unit.

18 Claims, 2 Drawing Sheets

OTHER PUBLICATIONS

"IP Multimedia Call Control Protocol based on Session Initiation Protocol (SIP) and Session Description Protocol (SDP); Stage 3 (Release 6);" 3GPP TS 24.229 V6.3.0; Jun. 2004; pp. 1-295.

"Signalling flows for the IP multimedia call control based on SIP and SDP; Stage 3 (Release 5);" 3GPP TS 24.228 V5.9.0; Jun. 2004; pp. 1-843.

International Search Report for International Application No. PCT/2005/052914; mailed Sep. 16, 2005.

"IP Multimedia (IM) session handling; IM call model; Stage 2 (Release 6)", Technical Specification Group Core Network, 3GPP TS 23.218 V6.1.0, Mar. 2004, pp. 1-56.

"Presence service based on Session Initiation Protocol (SIP); Functional models, information flows and protocol details", Technical Specification Group Core Network, 3GPP TR24.841 V6.0.0, Jun. 2004, pp. 1-150.

S. Olsen, "A Mechanism for Content Indirection in Session Initiation Protocol (SIP) Messages", IETF, Jun. 2, 2003, pp. 1-16.

* cited by examiner

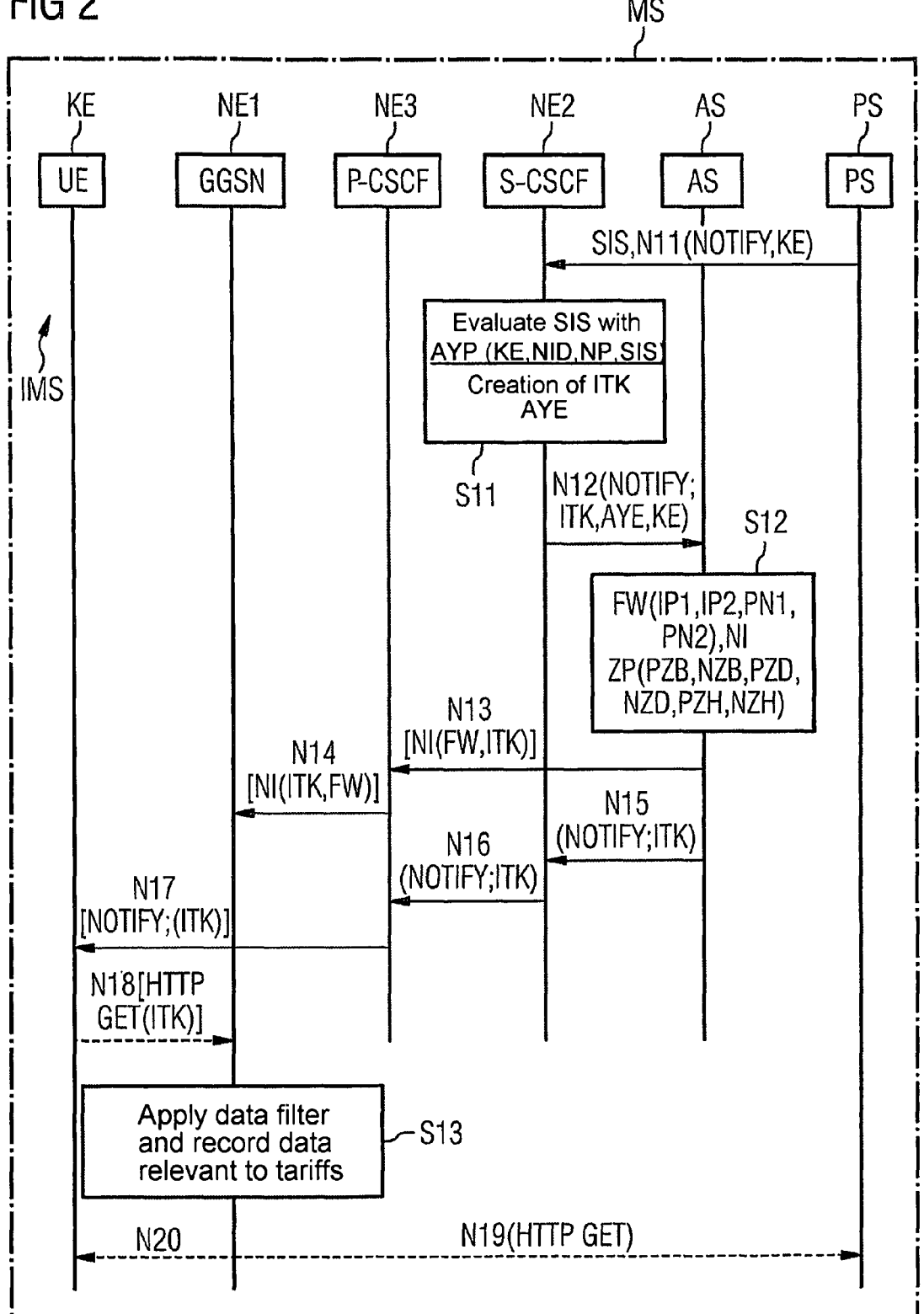

METHOD FOR MONITORING MESSAGE TRAFFIC, AND A FIRST AND SECOND NETWORK UNIT FOR THE EXECUTION THEREOF

CROSS REFERENCE TO RELATED APPLICATIONS

This application is based on and hereby claims priority to German Application No. 10 2004 036 732.9 filed on Jul. 29, 2004, the contents of which are hereby incorporated by reference.

BACKGROUND

The Session Initiation Protocol (SIP) is a control protocol for application layers, i.e. a signaling protocol for establishing, modifying and clearing down multimedia sessions. SIP is known from "SIP: Session Initiation Protocol", RFC 3261, June 2002, http://www.ietf.org. These multimedia sessions are taken to mean multimedia conferences, Internet telephone calls (Voice Over IP) and similar applications for example. SIP can be used to invite participants into multimedia sessions and also to add them to multimedia sessions which are already active. One of the capabilities of SIP is to locate a participant and thereby a specific terminal, assign an address to the terminal and also to redirect connections.

SIP has been selected by 3GPP (3GPP—Third Generation Partnership Project) as the signaling protocol for the IP multimedia subsystem (IMS—IP Multimedia Subsystem, IP—Internet Protocol). Thus IMS has been used to help provide an expansion of the UMTS (UMTS—Universal Mobile Telecommunications System) core network for implementing IP-based services.

The publications IETF RFC 3313, "Private Session Initiation (SIP), Extension for Media Authorization", January 2003, 3GPP TS 24.229 "IP Multimedia Call Control Protocol based on SIP and SDP, Stage 3" and 3GPP TS 23.203 "End-to-End Quality of Service Concept and Architecture" describe a method with which data connections which are needed for an SIP-based session can be authorized. The quantity of data which is to be exchanged via this data connection is detected in the GPRS (GPRS—General Packet Radio System) network. However this system does not allow any recording or filtering of the transmitted data messages at application level.

The German patent application with the file reference 10 2004 009 289.3 "Verfahren zur Steuerung und Auswertung eines Nachrichtenverkehrs einer Kommunikationseinheit durch eine erste Netzwerkeinheit innerhalb eines Mobilfunksystems sowie dazugehörige Kommunikationseinheit und erste Netzwerkeinheit" (Method for control and evaluation of message traffic of a communication unit within a mobile radio system as well as associated communication unit and first network unit) describes a method with which one or more messages of the message traffic of a communication unit are forwarded on the basis of one or more items of utilization information, blocked and/or logged in a log file.

SUMMARY

An aspect is to provide a simple, efficient and flexible way of monitoring message traffic between a communication unit and a first network unit. This is achieved using the method described below.

In a method for monitoring message traffic between a communication unit and a first network unit of a mobile radio system, with this message traffic being initiated by an SIP control message, the SIP control message is evaluated by a second network unit on the basis of an analysis parameter and an analysis result is generated from this, utilization information is generated with the aid of the analysis result and the utilization information is transferred to the first network unit, with the aid of the utilization information from the first network unit the message traffic between the communication unit and the first network unit is monitored.

The method advantageously enables the message traffic of a communication unit to be monitored. The utilization information which specifies the methodology for the monitoring of the message traffic can be adapted individually for each communication unit.

Furthermore the utilization information is adapted depending on the result of the analysis, with the result of the analysis depending on the evaluation of the SIP control message based on at least one analysis parameter. This allows the utilization information and thereby the monitoring of the message traffic to be adapted depending on the SIP control message which initiates the message traffic.

A first network unit that performs monitoring of message traffic between a communication unit and the first network unit of a mobile radio system makes it possible for the method to be implemented in a network component, such as a GGSN (GGSN—Gateway GPRS Support Node) for example.

A second network unit that executes the method makes it possible to implement the inventive method for example in an S-CSCF (S-CSCF—Serving Call State Control Function Module).

BRIEF DESCRIPTION OF THE DRAWINGS

These and other objects and advantages will become more apparent and more readily appreciated from the following description of the preferred embodiments, taken in conjunction with the accompanying drawings of which:

FIG. 2 is a second message flow diagram, in which an SIP control message is sent to a second network unit, which transfers at least one item of utilization information to the first network unit, and in which the message traffic initiated by this SIP control message is monitored.

DETAILED DESCRIPTION OF THE PREFERRED EMBODIMENT

Figure 1:
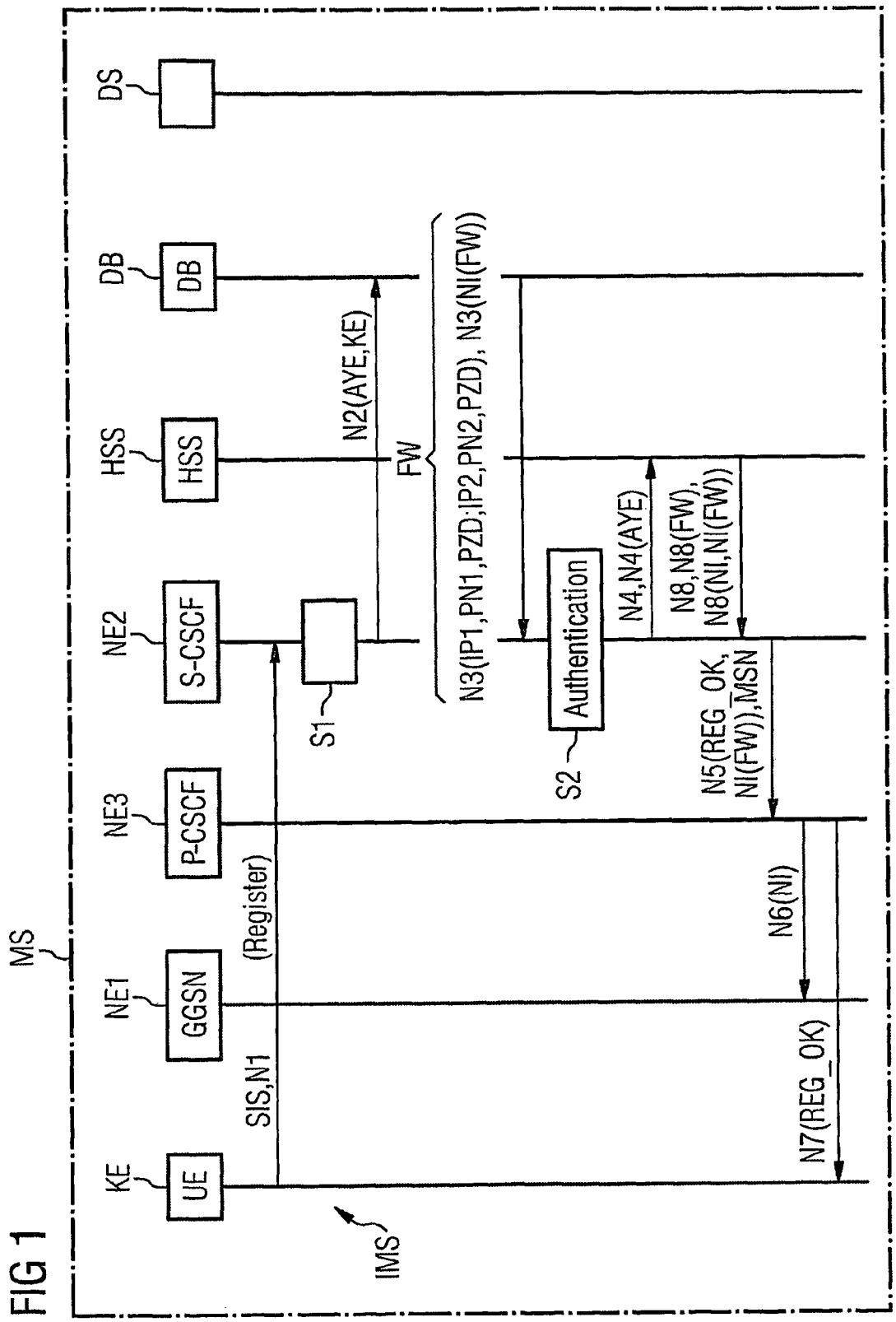
FIG. 1 is a message flow diagram, in which the registration of a communication unit in an SIP session creates at least one item of utilization information, transfers this to the first network unit, and in which the message traffic initiated by the registration message is monitored.

Reference will now be made in detail to the preferred embodiments, examples of which are illustrated in the accompanying drawings, wherein like reference symbols refer to like elements throughout.

In a first exemplary embodiment, FIG. 1 shows a message flow diagram for executing the method. In this embodiment the following units are involved in executing the method:

A communication unit KE, which typically exchanges messages, such as SIP control messages SIS for example, and/or data messages, with a data server DS. This communication unit KE is for example a mobile radio unit in accordance with the GSM (GSM—Global Systems for Mobile) standard or a stationary unit which is attached to an IP-based or ISDN-based fixed network (IP—Internet Protocol; ISDN—Integrated Subscriber Digital Network). Data messages are especially taken to mean messages for multimedia content, e.g. audio, video and/or picture data. The communication unit (KE) is implemented as User Equipment (UE) for example.

A first network unit NE1 for monitoring the message traffic from and to the communication unit KE. The first network unit NE1 can be embodied in the form of a GGSN (GGSN—Gateway GPRS Support Node; GPRS—General Packet Radio System).

A third network unit NE3, which is implemented for example as a P-CSCF (PCSCF—Proxy Call State Control Function).

A second network unit NE2, which is implemented for example as an S-CSCF (SCSCF—Serving Call State Control Function).

A user database HSS containing user-related information of the communication unit KE. This user database HSS can be implemented as a 3GPP-HSS (3GPP—3rd Generation Partnership Project; HSS—Home Subscriber Server).

Database DB, which provides information such as filtering instructions FW for example;

Data server DS, which provides audio data for downloading to the communication unit KE1 for example.

According to the method the first network unit NE1 monitors the message traffic from and to the communication unit KE, with this message traffic being initiated by an SIP control message SIS. Monitoring within the context of this document is to be understood as the filtering of individual messages from the message traffic, with messages either being forwarded or not forwarded and/or messages or information about messages, such as volumes of data of the messages for example, being logged. The monitoring is undertaken by the first network unit NE1. To this end the first network unit NE1 receives at least one item of utilization information N1, which specifies one or more requirements for monitoring the message traffic.

Thus at least one of the following filtering instructions FW is inserted in the utilization information N1:

At least one first IP address IP1 of a sender:
A sender of a message, such as the communication unit (KE) for example, can have a number of IP addresses. It is thus necessary to specify one of these IP addresses. For example the first IP address IP1="139.172.15.29" indicates standard IP version 4.

At least one first port number PN1 of a sender:
To distinguish between messages which belong to a sender's special application, port numbers are used in practice. In order to filter the message traffic of a user's specific application it is necessary to specify the first port number PN1. Often, in addition to the first port number PN1, the first IP address IP1 of the sender is also displayed to uniquely identify a specific application of the user of a message, such as the data server DS for example. For example the first port number is PN1="80", with this port number, in accordance with the document RFC1700, "ASSIGNED NUMBERS", October 1994, http://www.ietf.org, indicating the application HTTP (HTTP—Hyper Text Transfer Protocol).

At least one second IP address IP2 of a destination unit ZE:
To address a destination unit ZE of a message, such as a data server DS for example, it is useful in practice to specify an IP address, such as the second IP address IP2, for example. This second IP address IP2 uniquely identifies this destination unit ZE, for example IP2="139.172.54.101".

At least one second port number PN2 of the destination unit ZE:
To identify a specific application on the destination unit ZE a port number, such as the second port number PN2 for example, is in practice displayed in a message. If the second IP address IP2 is used together with the second port number PN2 in a message, both the application and also the destination unit ZE are uniquely specified. For example the second port number displays PN2="20".

One or more filtering instructions FW make it possible for the first network unit NE1 to monitor the message traffic between the communication unit KE and the first network unit NE1. For example a specific videotelephony application uses port number 1500 to exchange data. To establish such a service the communication unit KE connects to a videoserver which is accessible for example at the IP address "150.150.15.5". By specifying the second IP address IP2="150.150.15.5" and the second port number PN2=1500 the first network unit NE1 is able to monitor the specific message traffic of this videotelephony application from the communication unit KE to the videoserver. In a further example the communication unit KE will assign the IP address "95.94.93.92". The utilization information N1 typically includes a filter instruction FW, which specifies the first IP address IP1="95.94.93.92". This enables the first network unit NE1 to filter the entire message traffic, i.e. all messages from communication unit KE which include this first IP address IP1 as sender address. In a further and/or additional variant all messages and/or information about messages which contain this first IP address IP1 will be logged in a protocol unit.

In addition access parameters ZP can be employed to specify the use of one or more filter instructions FW in more detail. The individual parameters are as follows:

Positive Access Authorization PZB:
This access parameter specifies that the associated filter instruction FW, for example the specified second IP address IP2 may be accessed. This forwards a message which includes the positive access authorization PZB together with the second IP address IP2.

Negative Access Authorization NZB:
This access parameter specifies that the associated filter instruction FW, for example the specified second port number PN2, may not be accessed, i.e. a message to which the criterion of the filter instruction FW with this negative access authorization NZB applies is not forwarded.

Positive Access Time PZD:
The positive access time PZD specifies that period with which messages, to which the corresponding filter instruction FW with the positive access times PZD apply, may be sent, such as from the communication unit KE for example. For example the filter instruction FW indicates the second IP address IP2="139.172.15.101" and the positive access time PZD="4 minutes". This means that messages with the second IP address IP2 are forwarded for a period of 4 minutes. After 4 minutes these messages are no longer forwarded.

Negative Access Time NZD:
The negative access time NZD specifies the time within which a message, which includes the corresponding filter instruction FW may not be forwarded. For example IP2="139.1.1.5" NZD="2 days" indicates that messages which include this second IP address will be blocked. After 2 days the blockade will be lifted and messages with the second IP address will be forwarded again.

Positive Access Frequency PZH:

The positive access frequency PZH defines the number of messages to which the corresponding filter instruction FW applies which may be forwarded. After this number is reached, each further message to which this filter instruction applies is blocked. For example a maximum of five messages may be forwarded.

Negative Access Frequency NZH:

The negative access frequency NZH defines the number of messages to which the corresponding filter instructions FW apply which must be blocked. After this number is reached, each further message to which this filter instruction applies is forwarded.

By combining one or more filtering instructions FW together with one or more access parameters ZP the monitoring of the message traffic between the communication unit KE and the first network unit NE1 can be specified in more or less detail. The joint use of positive and negative access parameters of the same category, such as for example the positive access authorization PZB and the negative access authorization NZB, does not produce a meaningful filter instruction. Thus only one access parameter ZP can be specified within such a category, for example either the positive or the negative access frequency PZH or NZH.

It is of advantage to determine the filter instruction FW and/or the access parameter ZP with assistance of an XML syntax (XML—Extensible Mark Up Language). A standardized representation of the filter instruction FW and/or of the access parameter ZP can be achieved in this way. If not explicitly specified, a filter instruction FW is also to be understood below as a combination of filter instruction FW and access parameter ZP.

In the logging of the message traffic, i.e. messages and/or information about messages, the following parameters can be of particular interest:

Total data volume, such as all transmitted messages of the message traffic or per IP address and/or port number;

Data volume depending on one or more specific filtering instructions FW;

Transmission statistics of the transmitted messages, such as the number of messages per unit of time for example;

Number of messages per IP address and/or port number, such as per second IP address IP2 and second port number PN2 for example.

Furthermore additional parameters, such as a time of day and/or date and/or a user identity NID can be recorded in a log file by the first network unit NE1, in order to allow a later evaluation, e.g. a volume of data transferred per user identity NID.

The method is explained in greater detail below with reference to the typical message flow diagram depicted in FIG. 1. This explains the dynamic creation and adaptation of the filtering instructions FW and/or the access parameters ZP. The communication unit KE transfers a first message N1 to the second network unit NE2. In this exemplary embodiment the SIP control message involved is a registration message. The SIP control messages SIS allow the establishment, the modification and the clearing down of multimedia sessions. In the Standards document 3GPP TS 26.229 "IP Multimedia Call Control Protocol based on SIP and SDP, Stage 3" as well as in 3GPP TS 24.228 "Signalling Flows for IP Multimedia Call Protocol based on SIP and SDP", in addition to a more detailed presentation of the functions of the Session Initiation Protocol (SIP) a listing of the SIP-specific control messages can also be inspected.

First of all this first message N1 is evaluated on the basis of at least one analysis parameter AYP by the second network unit NE2. This is indicated by reference characters S1 in FIG. 1. SIP filters at the SIP level are defined in document 3GPP TS 23.218 "IP Multimedia Session Handling, IM Call Modes, Stage 2". In general the analysis of the SIP control message SIS can be undertaken on the basis of the following analysis parameters AYP:

Message type of the SIP control message SIS:

The SIP protocol defines a plurality of different message types for an SIP control message SIS, such as for example to register a communication unit in a multimedia session or an SIP control message, with which only one communication unit is to be informed about a specific event.

At least one message parameter NP of the SIP control message SIS:

As well as the message type the evaluation of an SIP control message SIS can be undertaken as a function of at least one message parameter NP. A message parameter NP represents a parameter or a field of the SIP control message, such as an IP address, a port number, the user identity NID of the communication unit KE for example, or a coded data field within the SIP control message SIS. Thus all possible parameters or fields within an SIP control message SIS are understood as a message parameters NP, such as a length field of the SIP control message SIS for example.

The user identity NID of the communication unit KE is a unique identification for a specific application for example. A communication unit KE can have a number of user identifications NID so that for example the user identity NID="015" is assigned to an IP-based telephony application.

Thus a specific analysis parameter AYP indicates that for all SIP control messages SIS which are of message type "REGISTER", an analysis result is created and this is to be forwarded. If no analysis parameter AYP applies to the SIP control message SIS to be analyzed, the SIP control message SIS is forwarded to a recipient or a sender for example.

In the event of at least one analysis parameter AYP applying to the SIP control message SIS, an analysis result AYE is formed. The analysis result AYE can in this case be the result of the analysis of the SIP control message SIS based on one or more analysis parameters AYP. The analysis result AYE typically has the following structure:

AYE="communication unit: KE1;
Message type: REGISTER;
Second port number PN2: 1713;
Second IP address IP2: 139.172.15.51"

In the exemplary example shown in FIG. 1 the first message N1 is an SIP control message SIS of message type "REGISTER". Next, the second network unit NE2 uses a second message N2 to request at least one filter instruction FW from the database DB. Preferably this second message N2 also includes the analysis result AYE and a specification for the communication unit KE. After receipt of this second message N2 the database DB generates at least one filter instruction FW, which is supplemented by one or more access parameters ZP. On the basis of the analysis result AYE the database DB detects for example which communication unit is responsible for triggering this second message N2, or which message type this second message N2 has initiated. This enables analysis parameters AYP to control the creation of the filter instruction FW. For example the database DB has a list of a number of filtering instructions FW for the communication unit KE which is sorted for example according to different message types or port numbers. This list with filtering instructions FW can be adapted from time to time, for example depending on a location of the communication unit KE1, on a network load of the mobile radio system MS or also on a time of day. In this exemplary embodiment a filter instruction FW is to grant the communication unit KE access to a multimedia session for 2 hours. To this end the database DB generates a number of filtering instructions FW which include the first and second IP address IP1, IP2 and the first and second port number PN1, PN2, with a positive access time PZD of 2 hours being assigned. After the filtering instructions FW are created, these are transferred by a third message N3 to the second network unit NE2.

Subsequently, at S2 an authentication of the communication unit KE can be undertaken. After successful authentication using a "Registration Notification Procedure" a fourth message N4 is used by the second network unit NE2 to inform the user database HSS that the communication unit KE has been registered by this unit. Subsequently the "User Profile", see 3GPP TS 23.218, is sent by the user database HSS to the second network unit NE2 using an eighth message N8.

After receiving the eighth message N8, the second network unit NE2 determines the utilization information N1 which in this example includes at least one filter instruction FW.

Furthermore the second network unit NE2 sends the utilization information N1 and confirmation information "REG_OK", which confirms the registration of the communication unit KE1 to the third network unit NE3, using a fifth message N5. The filtering instructions FW and the access parameters ZP can be represented with the aid of the XML syntax. The utilization information N1 can be transported in a specific SIP message MSN, especially in a new SIP header or in an SIP body, such as with the fifth message N5 for example.

After receiving the fifth message N5, the third network unit NE3 removes the confirmation information "REG_OK" from the fifth message N5 and transfers this using a sixth message N6 to the first network unit NE1. This means that the first network unit NE1 has the utilization information N1 and is thus able to filter the subsequent message traffic of the communication unit KE. Furthermore the third network unit NE3 removes the utilization information N1 from the fifth message N5 and forwards this in the form of a seventh message N7 to the communication unit KE. The communication unit KE is authorized after receiving the seventh message N7, to subsequently exchange messages, e.g. with the data server DS. The filtering of messages will be shown below with reference to the exemplary embodiment depicted in FIG. 2.

In a possible variant of the present exemplary embodiment all filtering instructions FW or the utilization information N1 are not generated by the database DB, but by the user database HSS and/or the second network unit NE2 and/or an application server AS. To this end for example the analysis result AYE can be integrated into the fourth message N4. In a similar manner to that described above for creation of at least one filter instruction FW by the database DB, the user database HSS now creates at least one filter instruction FW, which is supplemented by an access parameter ZP if necessary. At least one filter instruction FW is transmitted with the aid of the eighth message N8 to the second network unit NE2. This variant is especially advantageous, since on the one hand the database DB does not have to be integrated to set up the filtering instructions FW, and on the other hand transmission bandwidth can be saved by omitting the second and third message N2, N3.

Furthermore the second network unit NE2, the application server AS, the user database HSS and/or the database DB can adapt existing utilization information N1. For example the utilization information N1 is created by the database DB. After this has been received by the second network unit NE2, the second network unit NE2 can adapt or modify this before forwarding it. For example the second network unit NE2 knows about a current transmission bottleneck in the mobile radio system MS. To avoid further transmission problems the second network unit NE2 further restricts the transmissible and/or receivable messages with the aid of the filter instruction FW contained in the utilization message N1. Thus for example a second IP address IP2 is provided with a positive access frequency PZH.

With the aid of at least one filter instruction FW data of relevance to tariffs can be determined in the message traffic between the first network unit NE1 and the communication unit KE, such as the volume of payload data transmitted for example. This guarantees that the message traffic which was initiated as a result of the SIP control message SIS can be associated with this SIP control message SIS. This makes situation-related billing of the data connection possible, for example depending on the service and also on the origin of this service. Since however specifying a second IP address IP2 or second port number PN2 is not sufficient in every case to uniquely correlate the message traffic with the SIP control message SIS, in an expansion of the method an identification characteristic ITK can be inserted into each message of this message traffic. This identification characteristic ITK is generated for example by the second network unit NE2 and transferred with the aid of the utilization information N1 to the first network unit NE1 as well as being transferred to the communication unit KE. Subsequently this identification characteristic ITK is integrated into all messages which are generated on the basis of the SIP control message SIS. This also makes unique filtering of the message traffic caused by the SIP control message SIS possible.

FIG. 2 shows a further exemplary embodiment in which an SIP control message SIS is to be transferred from a Presence Service PS to the communication unit KE. The Presence Service PS is described in more detail in 3GPP TR 24.847 "Presence Service based on SIP, Functional Models, Information Flows and Protocol Details".

The Presence Service PS initially sends an eleventh message N11 to the second network unit NE2, to transfer to the communication unit KE a reference to a presence document. The presence document for example contains a page of a newspaper. This reference is made here by specifying an address by the Content Indirection method within the first message; see IETF "draft-ieff-sipcontent-indirect-mech-03.txt", http:\\www.ietf.org. The second network unit NE2 evaluates the eleventh message N11 which corresponds to a control message SIS in processing S11 on the basis of at least one analysis parameter AYP. For example, by setting an SIP filter in the second network unit NE2 to the Presence Service PS and the Content-Indirection method, e.g. as a component of the "Filter Criteria" in 3GPP TS 23.218, the second network unit NE2 can be instructed to forward this eleventh message N11 to the specific application server AS. The application server AS for example includes a processing unit with a memory module. The Application Server AS can control applications, such as a Presence Service for example.

The second network unit NE2 then generates the analysis result AYE and an identification characteristic ITK, with the identification characteristic ITK uniquely identifying the message traffic initiated by this SIP control message SIS. In a twelfth message N12 the second network unit NE2 transfers the eleventh message N11 with at least the identification characteristic ITK to the application server AS. Furthermore this twelfth message N12 can also contain the analysis result AYE and/or a reference to the communication unit KE. An SIP header which already exists or a new SIP header to be defined can be used to transport the identification characteristic ITK in the twelfth message N12.

The application server AS evaluates the twelfth message N12 and generates at least one filter instruction FW, which is supplemented if necessary by one or more parameters ZP. In processing S12, the application server AS creates utilization information N1, which, as well as at least one filter instruction FW also includes the unique identification characteristic ITK, and subsequently sends this in the form of a thirteenth message N13 to the third network unit NE3. The third network unit NE3 forwards this thirteenth message N13 in the form of a fourteenth message N14 to the first network unit NE1. This means that the first network unit NE1 knows the filtering instructions FW and additionally the identification characteristic ITK. Since the filtering instructions FW and the identification characteristic ITK are generated on the basis of the SIP control message SIS, this makes possible a unique assignment of each message of the message traffic caused by the SIP control message SIS.

Furthermore the application server AS transfers in a fifteenth message N15 the message "NOTIFY" together with the identification characteristic ITK to the second network unit NE2, which forwards this fifteenth message N15 in the form of a sixteenth message N16 to the third network unit NE3. After this the third network unit NE3 sends the sixteenth message N16 in the form of a seventeenth message N17 to the communication unit KE. A receive unit of the communication unit KE receives this seventeenth message N17 and the seventeenth message N17 is evaluated by a processing unit of the communication unit KE. In this analysis it is detected that this is a message of message type "NOTIFY", i.e. an SIP notification, and additionally that each further message, which is sent on the basis of this seventeenth message N17 by the communication unit KE must include the identification characteristic ITK.

Subsequently the communication unit KE sends an eighteenth message N18, such as an HTTP-Request GET of message type "GET" for example using the protocol HTTP (HTTP—Hyper Text Transfer Protocol) to the first network unit NE1. Since this eighteenth message N18 is created in conjunction with the seventeenth message N17, the communication unit KE must insert the identification characteristic ITK into the eighteenth message N18. The first network unit NE1 detects the identification characteristic ITK in the eighteenth message N18 and subsequently applies one or more filtering instructions FW at S13 in FIG. 2. In the event of this eighteenth message N18 being allowed to be forwarded because of a filter instruction FW, or of forwarding not being blocked by any filter instruction FW, the first network unit NE1 forwards the eighteenth message N18 in the form of a nineteenth message N19 without the identification characteristic ITK. Should the forwarding of the eighteenth message N18 not be permitted, the communication unit KE is informed with the aid of a twentieth message N20.

In an alternative embodiment the functionalities of the second network unit NE2, such as evaluating the SIP control message SIS, generating the identification characteristic ITK or also the triggering of the application server AS for example, are taken over by the third network unit NE3.

In addition or as an alternative, the first communication unit KE1 can log the message traffic, such as for example the messages with the identification characteristic ITK, in a log file for subsequent evaluation. The method makes it possible to correlate the logged information of the log file, such as volume of data of the second IP address IP2 for example, with the SIP signaling message SIS.

In the exemplary embodiments in accordance with FIGS. 1 and 2 the filtering instructions FW and where necessary the access parameters ZP are first established and are subsequently used for monitoring the message traffic. In a possible advantageous expansion of the method one or more filtering instructions FW and also the associated access parameters ZP can be changed dynamically. For example the transmission capacity changes within the mobile radio system MS. To avoid overloading the mobile radio system MS, access by the communication unit KE is restricted with the aid of an additional and/or changed filter instruction FW. This additional filter instruction FW is generated for example by the second network unit NE2 and transferred with the aid of the third network unit NE3 in the form of utilization information N1 to the first network unit NE1. After receipt of this additional filter instruction FW this additional filter instruction FW is also taken into account for the further traffic. Alternatively a new set of filtering instructions FW can also be established, by the second network unit NE2 for example, which, after transfer to the first network unit NE1 overwrites the existing set of filtering instructions FW with the new filtering instructions FW.

A mobile radio system MS for example to be understood as including the communication unit KE, and the first, second and third network unit NE1, NE2, NE3. Such a mobile radio system is for example a part of a GSM (GSM—Global System for Mobile) mobile radio system or of a UMTS (UMTS—Universal Mobile Telecommunications System) mobile radio system.

The first network unit NE1 monitors message traffic between the communication unit KE and the first network unit ME of a mobile radio system MS. To this end the first network unit has a device for sending and also a device for receiving messages. In addition the first network unit NE1 contains a processing unit for processing the messages to be received and to be transmitted, as well as for analysis of these messages on the basis of at least one item of utilization information N1 in accordance with the method. The transmit device, receive device and the processing unit can be connected to each other over a connection network for exchange of information.

The second network unit NE2 includes a transmit and receive unit for transmitting and receiving messages, as well as a processing unit for analysis of messages and for controlling the processing in accordance with the method, especially the creation of the utilization information N1. The processing, transmit and receive units are connected to each other via a connection network for exchanging information with each other.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

The invention claimed is:

1. A method for monitoring message traffic, initiated by a session initiation protocol control message, between a communication unit and a first network unit of a mobile radio system, comprising:
   analyzing the session initiation protocol control message by a second network unit to establish an analysis result based on at least one analysis parameter;
   creating utilization information, including at least one access parameter providing positive or negative access authorization, positive or negative access time, and positive or negative access frequency, based on the at least one analysis parameter of the analysis result;

establishing of at least one filtering instruction established and adapted by a user database;

transferring the utilization information to the first network unit; and using, by the first network unit, the utilization information to monitor the message traffic between the communication unit and the first network unit.

2. A method as claimed in claim 1, wherein said analyzing of the session initiation protocol control message produces the analysis results based on at least one of a message type of the session initiation protocol control message, at least one message parameter of the session initiation protocol control message.

3. A method as claimed in claim 2, wherein the at least one message parameter of the session initiation protocol control message provides at least one of an identifier of the communication unit and a user identity of the communication unit.

4. A method as claimed in claim 3, wherein said creating of the utilization information includes inserting at least one filtering instruction for at least one of a first IP address of a sender of a message, a first port number of a sender of the message, a second IP address of a destination unit of the message, and a second port number of the destination unit of the message.

5. A method as claimed in claim 1, wherein the filtering instruction has an extensible mark up language syntax.

6. A method as claimed in claim 1, wherein the utilization information is established and adapted by a Home Subscriber Server.

7. A method as claimed in claim 1, wherein the utilization information is at least one of created and modified by a database.

8. A method as claimed in claim 1, wherein the utilization information is at least one of generated and adapted by an application server.

9. A method as claimed in claim 1, wherein the utilization information is at least one of established and modified by the second network unit.

10. A method as claimed in claim 1, wherein the utilization information further includes an identification characteristic.

11. A method as claimed in claim 1, wherein said creating of the utilization information integrates the utilization information into a specific session initiation protocol message.

12. A method as claimed in claim 1, wherein the communication unit is user equipment.

13. A method as claimed in claim 1, wherein the message traffic is transmitted over an Internet protocol multimedia subsystem.

14. A network unit in a mobile radio system, said network unit monitoring message traffic, initiated by a session initiation protocol control message, between said network unit and a communication unit, where a different network unit analyzes the session initiation protocol control message to establish an analysis result based on at least one analysis parameter, creates utilization information, wherein the creating of utilization information is controlled based on the at least one analysis parameter of the analysis result and establishing of at least one filtering instruction established and adapted by a user database and transfers the utilization information to said network unit, comprising:

a processing unit using the utilization information, in which at least one access parameter providing positive or negative access authorization, positive or negative access time, and positive or negative access frequency is inserted, to monitor the message traffic between the communication unit and said network unit.

15. A network unit as claimed in claim 14, wherein said network unit is a gateway general packet radio system support node.

16. A network unit in a mobile radio system having another network unit monitoring message traffic, initiated by a session initiation protocol control message, between the other network unit and a communication unit, comprising a processing unit analyzing the session initiation protocol control message to establish an analysis result based on at least one analysis parameter and creating utilization information, including at least one access parameter providing positive or negative access authorization, positive or negative access time, and positive or negative access frequency, based on the at least one analysis parameter of the analysis result and establishing of at least one filtering instruction established and adapted by a user database; and an output unit transferring the utilization information to the other network unit which uses the utilization information to monitor the message traffic between the communication unit and the other network unit.

17. A network unit as claimed in claim 16, wherein said network unit is a call status control module.

18. A network unit as claimed in claim 17, wherein the call status control module is a serving-call state control function module.

* * * * *